(12) United States Patent
Saito et al.

(10) Patent No.: US 8,009,376 B2
(45) Date of Patent: Aug. 30, 2011

(54) DISK DRIVE DEVICE AND METHOD FOR DETERMINING DATA TRACK FORMAT OF THE DISK DRIVE DEVICE

(75) Inventors: Takahiro Saito, Kanagawa (JP); Kazunari Tsuchimoto, Kanagawa (JP); Atsushi Kanamaru, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 230 days.

(21) Appl. No.: 12/283,731

(22) Filed: Sep. 12, 2008

(65) Prior Publication Data

US 2009/0080100 A1 Mar. 26, 2009

(30) Foreign Application Priority Data

Sep. 15, 2007 (JP) ................................. 2007-240291

(51) Int. Cl.
  *G11B 5/09* (2006.01)
(52) U.S. Cl. ............................................. 360/48; 360/63
(58) Field of Classification Search .................... None
See application file for complete search history.

(56) References Cited

U.S. PATENT DOCUMENTS

| | | | | |
|---|---|---|---|---|
| 5,872,673 A * | 2/1999 | Purkett | ............... | 360/78.08 |
| 6,693,766 B1 * | 2/2004 | Wilkes et al. | ............... | 360/78.08 |
| 7,075,747 B2 | 7/2006 | Takaishi | | |
| 7,145,740 B2 * | 12/2006 | Zayas et al. | ............... | 360/48 |
| 7,283,316 B2 * | 10/2007 | Chiao et al. | ............... | 360/48 |
| 7,436,610 B1 * | 10/2008 | Thelin | ............... | 360/48 |
| 2004/0179292 A1 | 9/2004 | Zayas et al. | | |
| 2005/0069298 A1 | 3/2005 | Kasiraj et al. | | |
| 2006/0082918 A1 | 4/2006 | Kosugi et al. | | |
| 2006/0215294 A1 | 9/2006 | Yamamoto | | |
| 2007/0076315 A1 * | 4/2007 | McMurtrey | ............... | 360/53 |

FOREIGN PATENT DOCUMENTS

JP 11-096682 A 4/1999

OTHER PUBLICATIONS

The Extended European Search Report corresponding to the European Application No. 08012239.3, date of mailing Nov. 6, 2008, 6 pages total.

* cited by examiner

*Primary Examiner* — Jason C Olson (57) ABSTRACT

Embodiments of the present invention help to improve the capacity and the performance of a disk drive device. According to one embodiment, a data track pitch is set to each recording surface. The recording surfaces are divided into bands. A hard disk drive (HDD) sequentially moves a head to an adjacent data track in a band and performs a head switch at the band end in its data accessing. On a recording surface, the number of data tracks in each band is variable; and each band is constituted by different number of data tracks as necessary. The number of data tracks in each band is set so that the radial position of the band end comes close to the radial position of the corresponding band end on another recording surface. Accordingly, even if the recording surfaces have different variation rates of the data track pitch in the radial direction, increase in process time due to head switches can be suppressed.

11 Claims, 10 Drawing Sheets

ROTATION

| SERVO | 0 | 140000 |
| HEAD0 | 0 | 120000 |
| HEAD1 | 0 | 130000 |
| HEAD2 | 0 | 125000 |
| HEAD3 | 0 | 130000 |

OD → ID (b)

| HEAD0 | 00 | 01 | 02 | 03 | 04 | 05 | 06 | 07 | 08 | 09 |
| HEAD1 | 00 | 01 | 02 | 03 | 04 | 05 | 06 | 07 | 08 | 09 | 10 |
| HEAD2 | 00 | 01 | 02 | 03 | 04 | 05 | 06 | 07 | 08 |
| HEAD3 | 00 | 01 | 02 | 03 | 04 | 05 | 06 | 07 | 08 | 09 |
| SERVO | 00 | 01 | 02 | 03 | 04 | 05 | 06 | 07 | 08 | 09 | 10 | 11 | 12 | 13 | 14 | 15 |

| | SB_0 | SB_1 | SB_2 | | SB_191 | SB_192 | SB_193 | | SB_1534 | SB_1535 |
|---|---|---|---|---|---|---|---|---|---|---|
| BAND | 0 | 1 | 2 | | 191 | 192 | 193 | | 1534 | 1535 |
| HEAD0 | 79 | 79 | 79 | ... | 79 | 78 | 78 | ... | 78 | 78 |
| HEAD1 | 0 | | | | | | | | | 130000 |
| HEAD2 | 0 | | | | | | | | | 125000 |
| HEAD3 | 0 | | | | | | | | | 130000 |

OD ———————————————————————— ID (b)

| BAND | 0 | 1 | 2 | | 191 | 192 | 193 | | 1534 | 1535 |
|---|---|---|---|---|---|---|---|---|---|---|
| HEAD0 | 79 | 79 | 79 | ... | 79 | 78 | 78 | ... | 78 | 78 |
| HEAD1 | ?? | ?? | ?? | ... | ?? | ?? | ?? | ... | ?? | ?? |
| HEAD2 | ?? | ?? | ?? | ... | ?? | ?? | ?? | ... | ?? | ?? |
| HEAD3 | ?? | ?? | ?? | ... | ?? | ?? | ?? | ... | ?? | ?? |

BAND 0 1 2                1498 1499

HEAD0 | 78 | 78 | 78 | · · · | 78 | 78 |

HEAD1 | 80 | 80 | 80 | · · · | 80 | 80 |

(a)

HEAD2 | 77 | 77 | 77 | · · · | 77 | 77 |

HEAD3 | 78 | 78 | 78 | · · · | 78 | 78 |

OD                                    ID

BAND 0 1 2                1498 1499

HEAD0 | 78 | 78 | 78 | · · · | 78 | 78 |

HEAD1 | 80 | 80 | 80 | · · · | 80 | 80 |

(b)

HEAD2 | 77 | 77 | 77 | · · · | 77 | 77 |

HEAD3 | 78 | 78 | 78 | · · · | 78 | 78 |

(Prior Art)

FIG. 10
(Prior Art)

DISK DRIVE DEVICE AND METHOD FOR DETERMINING DATA TRACK FORMAT OF THE DISK DRIVE DEVICE

CROSS-REFERENCE TO RELATED APPLICATION

The instant nonprovisional patent application claims priority to Japanese Patent Application No. 2007-240291 filed Sep. 15, 2007 and which is incorporated by reference in its entirety herein for all purposes.

BACKGROUND OF THE INVENTION

Disk drive devices using various kinds of media, such as optical disks, magneto-optical disks, flexible magnetic disks, and the like have been known in the art. In particular, hard disk drives (HDDs) have been widely used as storage devices of computers and have been one of the indispensable storage devices for current computer systems. Moreover, HDDs have found widespread application to moving image recording/reproducing apparatuses, car navigation systems, cellular phones, and the like, in addition to the computers, due to their outstanding characteristics.

A magnetic disk used in an HDD has multiple concentric data tracks and servo tracks. Each servo track contains multiple servo data having address information and each data track includes multiple data sectors containing user data recorded thereon. Data sectors are recorded between servo data discrete in the circumferential direction. A head element portion of a head slider supported by a swinging actuator accesses a desired data sector in accordance with address information in the servo data to write data to and retrieve data from a data sector.

In order to increase the storage capacity of an HDD or to improve the reliability of an HDD, it has been proposed to determine a data track pitch for each head (each recording surface). Determination of the data track pitch so as to match head characteristics such as a read width or a write width leads to suppression of adjacent track interference (ATI) in data write and increase in data capacity per recording surface.

Two approaches have been proposed to adjust the data track pitch for each recording surface. One is a method to make servo tracks conform to data tracks and adjust the servo track pitch for each recording surface in the servo track write (refer to Japanese Patent Publication No. 2006-114142 "Patent Document 1", for example). The other is a method to provide servo tracks with a common pitch to all recording surfaces and adjust the data track pitch for each recording surface.

In order to improve performance, a technique has been proposed that performs a head switch for every data track in sequential data write or data read. However, if the recording surfaces have different data track pitches, the head switch for every data track leads to degradation in performance. If the recording surfaces have different data track pitches, their respective data tracks show different radial positions even if their data track numbers are the same. Accordingly, a transition onto the same data track on another recording surface requires additional time for a head seek. To avoid the additional seek, a data track of close radial position must be found on the recording surface of the transition destination in every head switch. To this end, additional resources and time are required for this operation.

An effective approach to overcome this problem is a data track format in which a recording surface is constituted by multiple bands. Each band is constituted by multiple consecutive data tracks. Upon completion of an access to one data track, the HDD selects an adjacent data track in the same band as the next data track and switches heads at an end of the band. This reduces the number of head switches and suppresses increase in additional process time due to the head switches.

In the above data track format, the switch destination in a head switch is a data track at a band end on another corresponding recording surface. Each recording surface has the same number of bands; each band on a recording surface has the same number of data tracks, too. Specifically, a resulting value of dividing the number of data tracks on a recording surface by the predetermined number of bands is set to the number of data tracks in each band.

Figure 9:
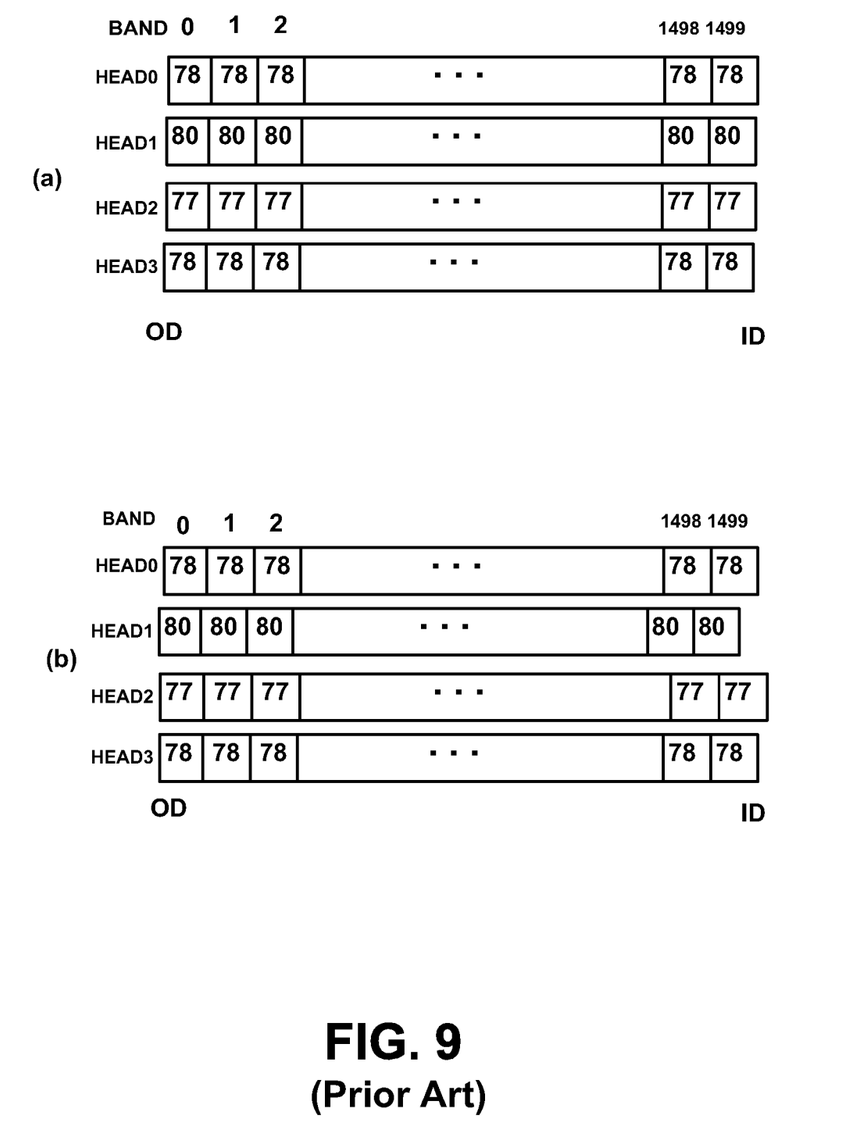
FIGS. 9(a) and 9(b) are drawings each schematically illustrating recording surfaces divided into bands in the case that the number of data tracks in a band is fixed on a recording surface in a conventional technique.

If the recording surfaces have invariable data track pitches, or if they have the same variation rate of the data track pitch in the radial direction, the radial positions of band ends are aligned as shown in FIG. 9(a). In the example of FIG. 9(a), all recording surfaces corresponding to four heads are divided into 1,500 bands each. The squares represent bands and the number in each square represents the number of data tracks in the band. On each recording surface, the number of data tracks in a band is invariable. Among the recording surfaces, the number of data tracks in a band on a recording surface is different from the one on another recording surface. If the variation rates of the data track pitches in the radial direction are the same, the radial positions of the band ends align with each other even if the recording surfaces have different total number of data tracks. Accordingly, the HDD can access the target data track quickly in a head switch.

Figure 10:
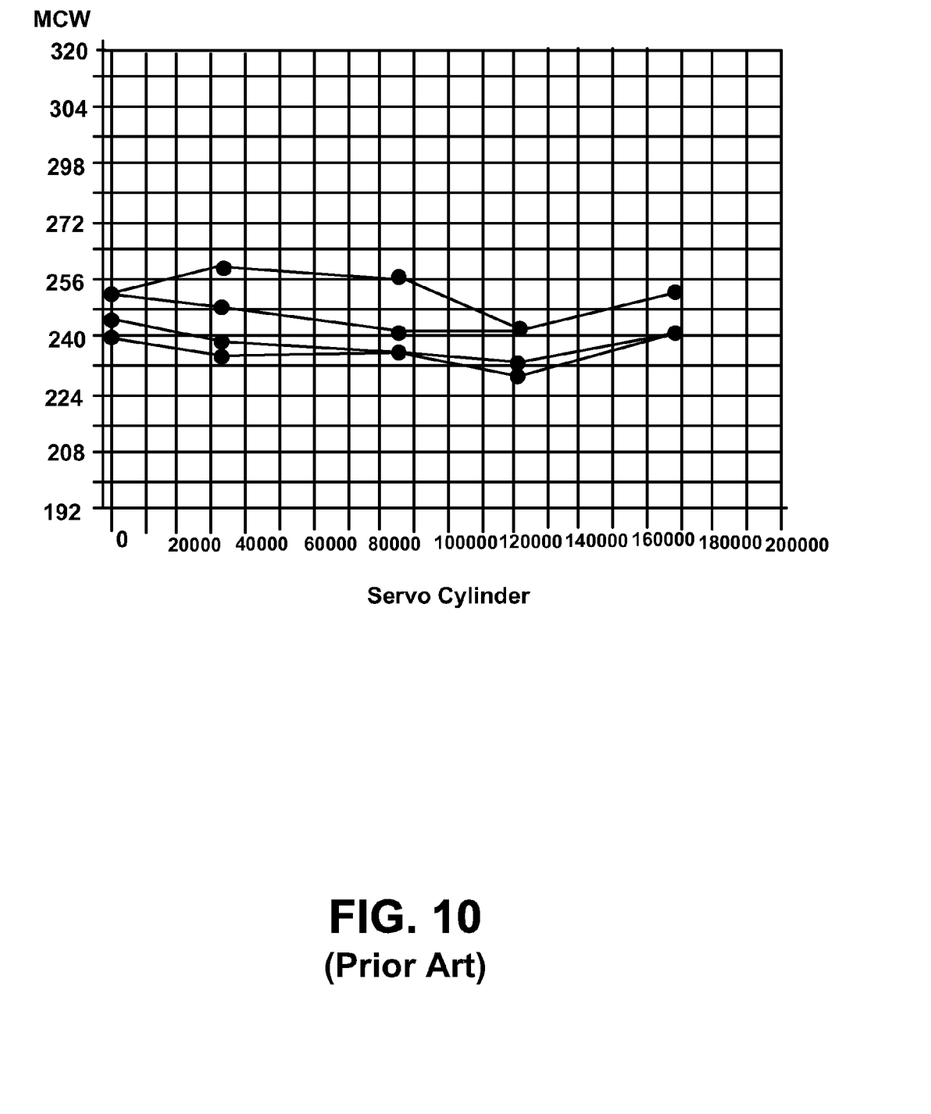
FIG. 10 is an example of measurements of the data track pitch for each head slider in a conventional technique.

On the other hand, if the recording surfaces (heads) have different variation rates of the data track pitch in the radial direction, the radial positions at the band ends do not align among the recording surfaces. FIG. 10 shows an example of measurements of the magnetic core width (MCW), i.e., the magnetic write width of each head with respect to the radial direction. The X axis represents servo tracks, and the Y axis represents the data width in writing the servo track in the unit of PES. It will be understood that the variation rates of the data track pitches significantly differ depending on the head. In this way, if the variation rates of the data track pitches are significantly different depending on the head, the differences between the band ends in the radial position become large among the recording surfaces so that efficient head switches cannot be performed. Therefore, an HDD having different increasing or decreasing rates of the data track pitch in each head requires a data track format which can accommodate the differences in head characteristics and achieves efficient head switches.

BRIEF SUMMARY OF THE INVENTION

Embodiments of the present invention help to improve the capacity and the performance of a disk drive device. In an embodiment of the present invention, a data track pitch is set to each recording surface. The recording surfaces are divided into bands. A HDD sequentially moves a head to an adjacent data track in a band and performs a head switch at the band end in its data accessing. On a recording surface, the number of data tracks in each band is variable; and each band is constituted by different number of data tracks as necessary. The number of data tracks in each band is set so that the radial position of the band end comes close to the radial position of the corresponding band end on another recording surface. Accordingly, even if the recording surfaces have different variation rates of the data track pitch in the radial direction, increase in process time due to head switches can be suppressed.

DETAILED DESCRIPTION OF THE INVENTION

Embodiments of the present invention relate to a disk drive device and a method for determining the data track format of the disk drive device, more particularly to a method for determining the number of tracks included in each band in a disk drive device which sets a data track pitch for each recording surface and for each data track.

An aspect of embodiments of the present invention is a method for determining data track formats on multiple recording surfaces for addresses designated by a host in a disk drive device. This method determines a data track pitch for each data track on each of the multiple recording surfaces. It determines the number of data tracks included in each band constituted by multiple data tracks on each of the multiple recording surfaces by reference to the radial position of each band end. It determines data track formats so that addresses designated by a host continues from each band end to a corresponding band end on another recording surface, while addresses designated by the host are continuous in each band. Determining the number of data tracks included in each band by reference to the radial position of each band end achieves efficient head switches.

In determining the number of data tracks included in each band, the method determines the number of data tracks in each band on one of the multiple recording surfaces, and then determines the number of data tracks in each band on another recording surface by reference to the band ends on the one of the multiple recording surfaces. This prevents that the number of data tracks in a specific band significantly differs from the one in another band.

In determining the number of data tracks included in each band, the method determines the number of data tracks in each band on the one of the multiple recording surfaces, locates servo tracks each corresponding to each band end on the one of the multiple recording surfaces, and then determines the number of data tracks in each band on another recording surface using the located servo tracks. Radial positions of the servo tracks corresponding to each other on the multiple recording surfaces may be substantially aligned with each other. This achieves easy and accurate determination of each band end.

Among the multiple recording surfaces, the number of data tracks included in each band are determined so that the difference in servo track number corresponding to a band end between bands having the same band number counted from the innermost or the outermost band falls within a reference number. This enables the process time of head switches to fall within a desired range.

On one of the multiple recording surfaces, the number of data tracks in each one of bands is determined so that the difference in the number of data tracks between the bands is no more than one, and the number of data tracks of bands on another recording surface are determined by reference to each band end on the one of the recording surface. This prevents that the number of data tracks in a specific band significantly differs from the one in another band.

In determining the number of data tracks in each band, the method determines servo track numbers corresponding to each band end, and determines the number of data tracks in each band on each recording surface using the servo track numbers. This achieves easy and accurate determination of each band end.

The method registers a data track including a greater number of errors than a reference number as a non-use data track to be skipped in data accesses. This reduces table contents necessary for registering non-use data tracks.

A disk drive device according to another aspect of embodiments of the present invention comprises multiple recording surfaces whose variation rates of data track pitches in the radial direction are different from each other, multiple heads corresponding to the multiple recording surfaces, a moving mechanism for supporting and concurrently moving the multiple heads, and a controller for controlling the moving mechanism and the multiple heads. Each of the multiple recording surfaces has multiple bands each constituted by multiple tracks, and the number of tracks included in each band on all or a part of the recording surfaces is not fixed. If the controller receives a command designating continuous addresses from a host, the controller performs continuous accesses in each band and further controls to perform a head switch at each band end. The number of servo tracks of movement in a head switch at each band end among the multiple recording surfaces may be no more than one. This achieves reduction in the process time for head switches.

Embodiments of the present invention achieve an increase in capacity and improvement in performance in a disk drive device.

Hereinafter, embodiments to which the present invention is applicable will be described. For clarity of explanation, the following descriptions and accompanying drawings may have omissions and simplifications as appropriate. Throughout the drawings, like components are denoted by like reference numerals and repetitive descriptions are omitted as not necessary. Hereinafter, a hard disk drive (HDD) will be described as an example of a disk drive device.

A HDD according to one embodiment has multiple recording surfaces. For the recording surfaces, servo track pitches do not conform to data track pitches. A recording surface is divided into bands each constituted by multiple data tracks. The HDD performs sequential accesses with head seeks without head switches within a band, and performs a head switch at the end of the band.

A feature of certain embodiments is that the number of data tracks in a band is variable and a band is constituted by different number of data tracks from another as necessary within a recording surface. The number of data tracks in bands are adjusted for all or a part of the recording surfaces. The number of tracks in a band is set so that the radial position of the band end comes close to the radial positions of the corresponding band ends on other recording surfaces. Thereby, increase in the process time for head switches can be suppressed among recording surfaces having different variation rates of the data track pitches in the radial direction.

Figure 1:
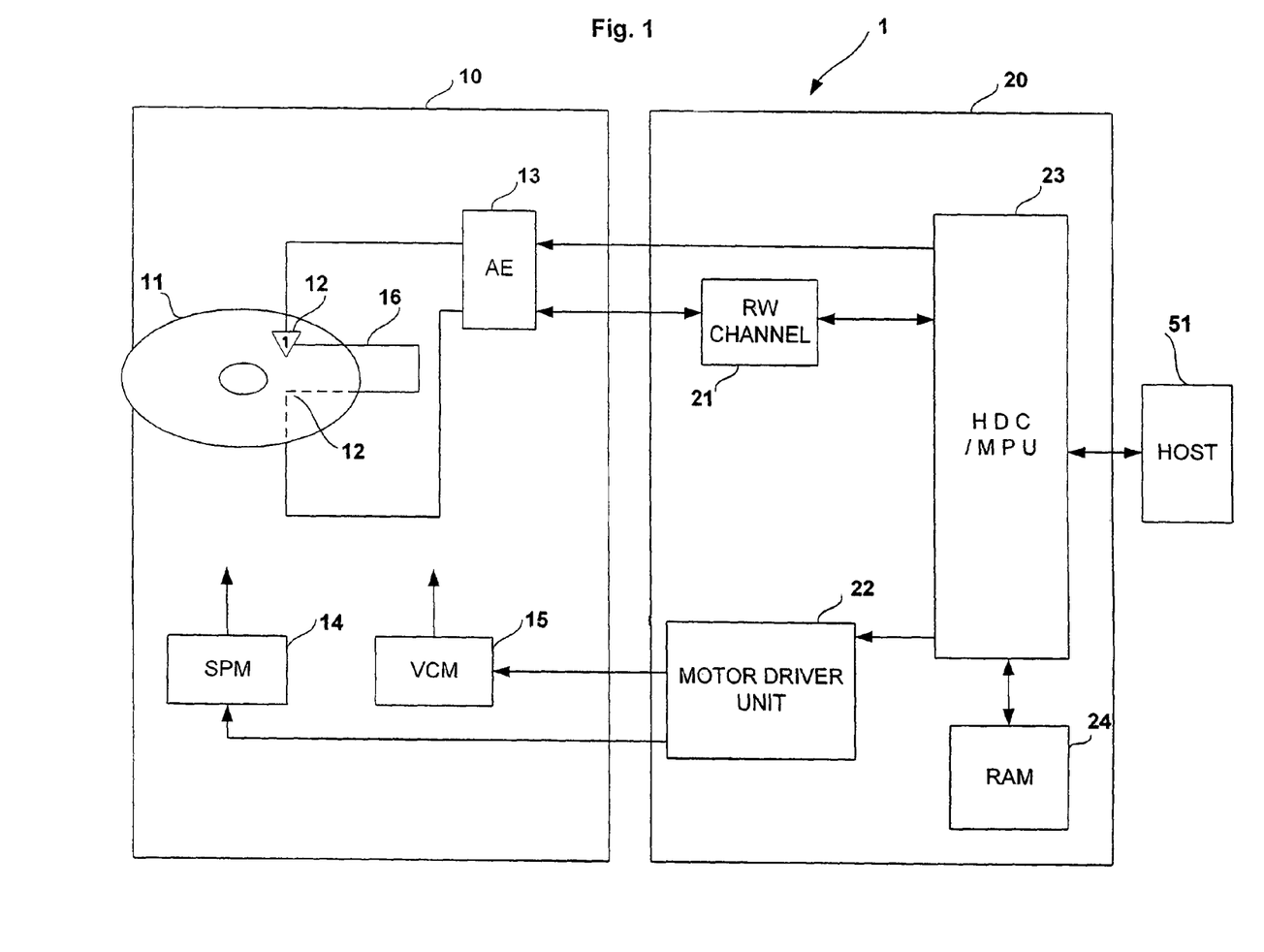
FIG. 1 is a block diagram schematically depicting the entire configuration of a hard disk drive according to one embodiment.

Before describing features of the embodiments, an entire configuration of an HDD will be outlined. FIG. 1 is a block diagram schematically depicting the entire configuration of an HDD 1. The HDD 1 comprises a circuit board 20 fixed outside an enclosure 10. On the circuit board 20, circuits such as a read-write channel (RW channel) 21, a motor driver unit 22, an integrated circuit (HDC/MPU) 23 of a hard disk controller (HDC) and an MPU, and a semiconductor memory RAM 24 are mounted. In the enclosure 10, a spindle motor (SPM) 14 spins a magnetic disk 11 at a specific angular rate. The magnetic disk 11 is a disk for storing data. In accordance with control data from the HDC/MPU 23, the motor driver unit 22 drives the SPM 14.

Head sliders 12 each comprise a slider flying over the magnetic disk and a head element portion fixed to the slider for converting magnetic signals into/from electric signals. A head slider 12 is an example of a head. An arm electronics (AE) 13 selects a head slider 12 to access (read or write) the magnetic disk 11 from multiple head sliders 12 in accordance with control data from the HDC/MPU 23 and amplifies read/write signals. Each head slider 12 is fixed to the tip end of an actuator 16. The actuator 16, which is coupled to a voice coil motor (VCM) 15, pivots about a pivotal shaft to move the head slider 12 above the spinning magnetic disk 11 in its radial direction. The assembly of the actuator 16 and the VCM is the moving mechanism of the head. The motor driver unit 22 drives the VCM 15 in accordance with control data from the HDC/MPU 23.

The RW channel 21, in a read operation, extracts servo data and user data from read signals obtained from the AE 13 to decode them. The decoded data are supplied to the HDC/MPU 23. In a write operation, the RW channel 21 code-modulates write data supplied from the HDC/MPU 23 and converts the code-modulated data into write signals to supply them to the AE 13. In the HDC/MPU 23, the HDC is a logic circuit and the MPU operates in accordance with firmware loaded in the RAM 24. The HDC/MPU 23 is an example of a controller and performs entire control of the HDD 1 in addition to processes necessary for data processing such as head positioning control, interface control, defect management, and the like.

FIG. 2(a) schematically depicts a data structure of an entire recording surface of the magnetic disk 11, and FIG. 2(b) schematically depicts a data format of a part of the recording surface. On the recording surface of the magnetic disk 11, multiple servo areas 111 each extending radially in the radial direction from the center of the magnetic disk 11 and being located discretely at every specific angle and data areas 112 each formed between two adjacent servo areas 111 are provided. In each servo area 111, servo data for positional control of a head slider 12 are recorded. In each data area 112, user data are recorded.

On the recording surface of the magnetic disk 11, multiple data tracks (DTr) 114 having a specific width in the radial direction are formed concentrically. The user data are recorded along data tracks 114. A data track 114 includes a data sector as a record unit of user data and is typically constituted by multiple data sectors. Typically, a plurality of data tracks are grouped into a plurality of zones 113a to 113c according to their radial positions on the magnetic disk 11. The number of data sectors included in a data track 114 is set to each of the zones.

Similarly, the magnetic disk 11 includes multiple concentric servo tracks (STr) 115 having a specific width in the radial direction. Each servo track 115 is constituted by multiple servo data split by a data area 112. Servo data include a servo track number, a servo sector number in the servo track, and burst patterns for fine positional control. The burst patterns are constituted by, for example, four burst patterns A, B, C, and D different in the radial position. The amplitudes of reproducing signals of each burst pattern can determine the position in the servo track. The position in the servo track can be expressed by a so-called position error signal (PES) value. The PES value is calculated from the amplitudes of the burst patterns A, B, C, and D; and for example, one servo track is divided into 256 PES values in the radial direction.

As illustrated in FIG. 2(b), the servo track pitch does not conform to the data track pitch on the same recording surface in the present embodiment. Data track pitches are individually set depending on the characteristics of the head slider 12. Determining a data track pitch for each head slider 12 leads to the optimum data track pitch corresponding to the characteristics of the head slider 12, which achieves reduction in the adjacent track interference in data write and increase in the storage capacity (the number of data tracks).

Since data track pitches differ depending on each head slider 12, the recording surfaces have different total number of data tracks depending on the head slider 12, too. FIG. 3(a) shows an example of the number of data tracks on each recording surface in an HDD 1 with four heads (two disks). The head sliders (HEAD0 to HEAD3) are arranged in the manner as shown in the drawing; the HEAD0 is the top head slider, and the HEAD3 is the bottom head slider. The total number of data tracks on the recording surface corresponding to the HEAD0 is 120,000, the total number of data tracks on the recording surface corresponding to the HEAD1 is 130,000, the total number of data tracks on the recording surface corresponding to the HEAD2 is 125,000, and the total number of data tracks on the recording surface corresponding to the HEAD3 is 130,000.

The number of servo tracks is the same, 140,000, in all of the recording surfaces. In typical fabrication of the HDD 1, the SPM 14, the magnetic disks 11, the assembly of the actuator 16 and the head sliders 12, and the VCM 15 are mounted in the enclosure 10; and then servo data are written on each recording surface with the corresponding head slider 12. This servo write may be performed by a method using a servo track writer (STW) as an external device or a method to write servo data with controlling the VCM 15 in the HDD 1 (self-servo-write: SSW).

The STW has a pin, and moves the actuator 16 from the external using the pin to locate the actuator 16 to the target position. The actuator 16 supports all of the head sliders 12. The head sliders 12 concurrently write servo data on their respective corresponding recording surfaces. In the SSW, a controller controls the VCM 16 to set the actuator 16 to the target position. The servo track pitch is not invariable but varies depending on the radial position.

The SSW performs servo control using servo data on the recording surface read by a selected head slider 1216 (propagation head). The head sliders 12 concurrently write servo data. Such a servo write writes servo tracks at the same radial positions on the recording surfaces. A circuit implemented on the HDD 1, such as an HDC/MPU 23, may perform the SSW. Embodiments of the present invention may be applied to a fabricating method which writes servo data with an external device before mounting the magnetic disks 11 inside the enclosure 10 and an HDD 1 fabricated by the method.

The HDD 1 determines a data track format of each recording surface after writing the servo tracks. The HDD 1 determines the data track pitch for each head slider 12 according to the head characteristics such as a write width (size of a write element in the radial direction) and a read width (size of a read element in the radial direction) of each head slider 12. The data track pitch is not fixed but varies depending on the radial position.

Figure 3:
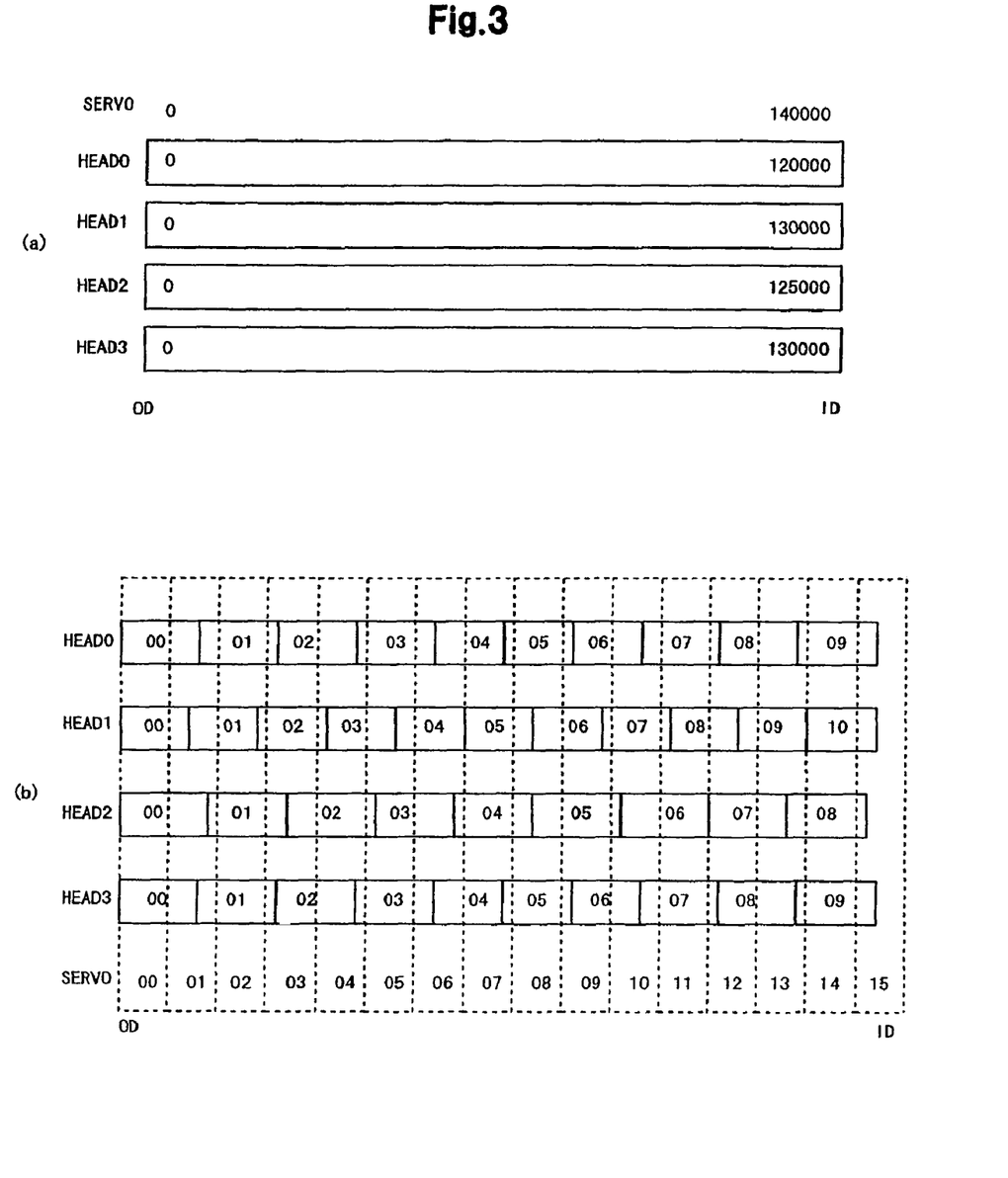
FIGS. 3(a) and 3(b) are drawings schematically illustrating the relationship between data tracks and servo tracks on the recording surfaces in one embodiment.

FIG. 3(*b*) schematically shows data tracks and servo tracks corresponding to a part of the four recording surfaces. FIG. 3(*b*) shows 16 servo tracks from the outermost diameter (00) toward the inner diameter (ID) and the corresponding data tracks for each head slider 12. For example, data tracks 00 to 09 are shown for the HEAD0.

As shown in FIG. 3(*b*), the servo tracks of the recording surfaces are provided at the same radial positions. The servo track pitch (servo track) and each of the data track pitches (data track widths) of the recording surfaces are set independently from each other and basically do not conform to each other. The data track pitches (data track widths) of the recording surfaces are also set independently from each other and basically do not conform to each other. A data track pitch and a servo track pitch vary depending on the radial position and the data track pitches of the recording surfaces at the same radial position are basically different. Moreover, the variation rates of the data track pitches of the recording surfaces in the radial direction are basically different.

Figure 4:
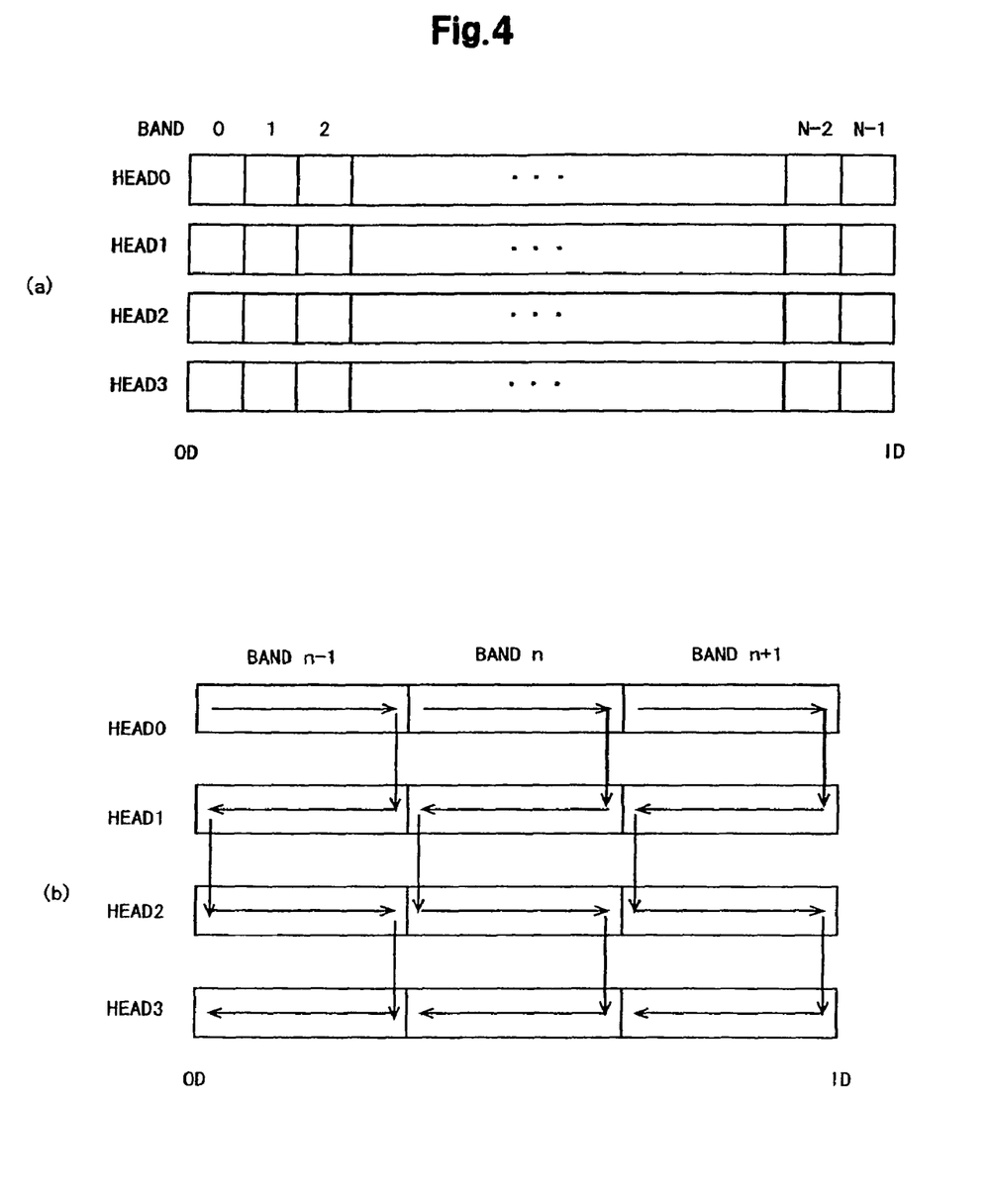
FIGS. 4(a) and 4(b) are drawings schematically illustrating the recording surfaces divided into bands and movement of head sliders for the bands in one embodiment.

The HDD 1 according to one embodiment has recording surfaces each divided into multiple bands. FIG. 4(*a*) shows an example that each recording surface is divided into N number of bands. The number of bands on each recording surface is the same. Each band is constituted by multiple data tracks in a physically continuous area. In a recording surface, each data track belongs to a single band and another band does not overlap the band.

A method for performing head seeks in a sequential access on multiple recording surfaces divided into multiple bands will be described referring to an example of FIG. 4(*b*), in which the HDD 1 accesses BANDn. Upon obtaining a read command or a write command from the host 51, the HDC/MPU 23 controls other components to access data sectors at the addresses designated by the host. A command specifies the start address (LBA) of the access destination and the subsequent address length. Accordingly, a process according to the single command is a sequential access for the addresses. For example, the HEAD0 first accesses a specific data track in the BANDn. After completion of the access to the first data track, the HEAD0 moves to an inner adjacent data track. The HEAD0 continues to move sequentially to the next inner adjacent tracks until reaching the data track at the end of the BANDn.

When the HEAD0 reaches the end of the data track at the inner band end, the HDC/MPU 23 switches the access head from the HEAD0 to HEAD1. The access destination of the HEAD1 is the BANDn as same as the HEAD0. The HDC/MPU 23 sequentially moves the HEAD1 toward the outer diameter in the BANDn. Specifically, after the head switch, the HEAD1 accesses a data track at the outer inner band end of the BANDn. When the HEAD1 reaches the end of the data track, it moves to an outer adjacent data track to perform accesses. The HEAD1 moves to the outer adjacent data track at every data track end. When the HEAD1 reaches the data track end at the outer band end, the HDC/MPU 23 switches the access head from the HEAD1 to HEAD2. The HEAD2 accesses each data track in the BANDn in the same way as the HEAD0.

In this way, in the accesses to the continuous addresses designated by the host, the HDC/MPU 23 selects an adjacent data track in the same band as the next data track after completion of an access to one data track. When the head slider 12 reaches the data track end at the band end, the HDC/MPU 23 switches the head sliders 12. The switch destination may not be the adjacent head slider 12 like the above example. For head operation like this, the addresses designated by the host are continuous in each band and continue from each band end to the band end on another corresponding recording surface.

Figure 2:
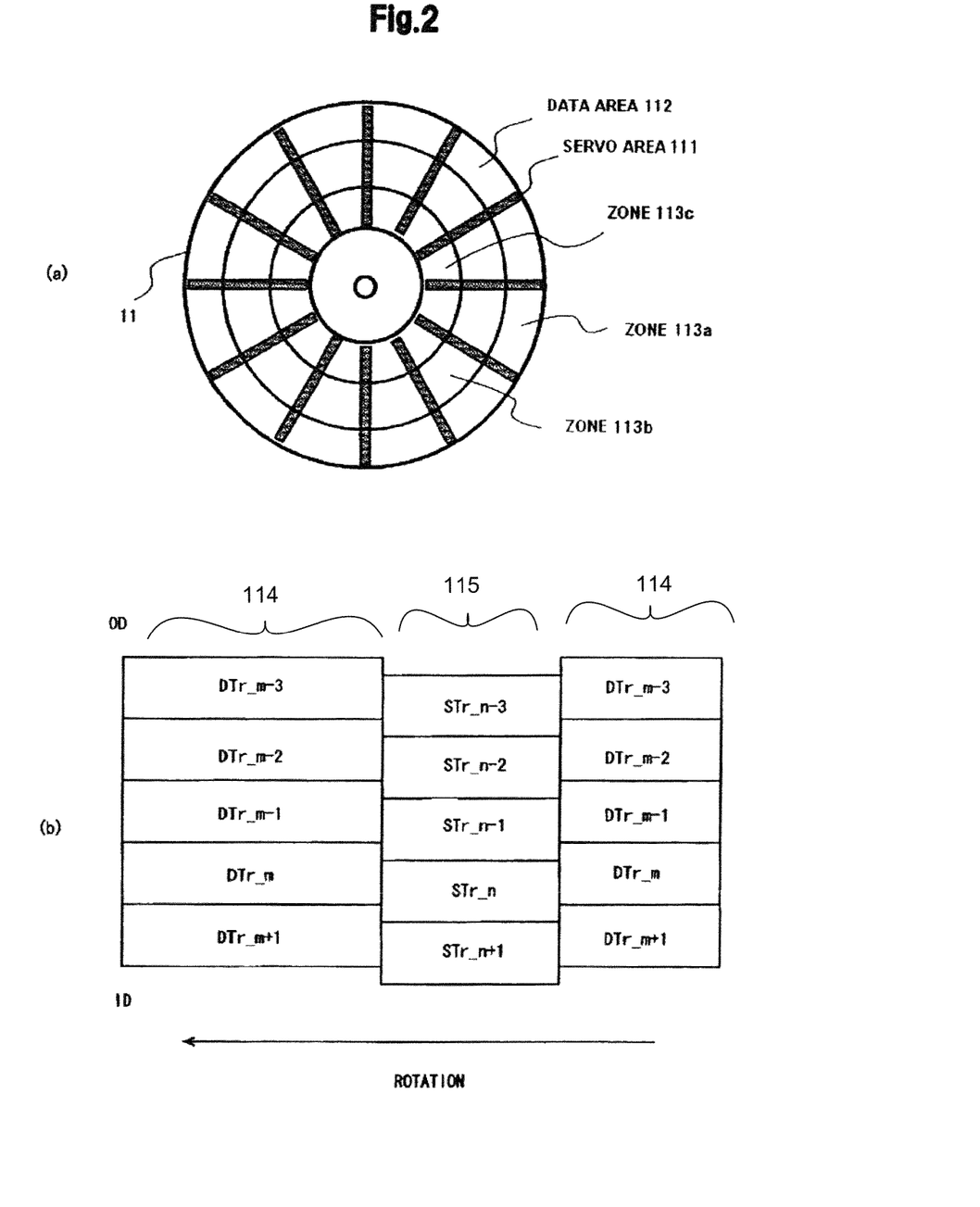
FIGS. 2(a) and 2(b) are drawing schematically illustrating a data format on a recording surface in one embodiment.

After the head switch, the head slider 12 of the switch destination accesses the data track at the band end. Therefore, in order to prevent increase in process time due to the head switch, the radial positions of the band ends before and after the switch should be close to each other. As explained referring to FIGS. 2(*b*), 3(*a*), and 3(*b*), the variation rates of the data track pitches of the recording surfaces according to the present embodiment are not the same. If the same number of bands is assigned to each recording surface, and further, the number of data tracks in a band is fixed on each recording surface, considerable differences may arise between the radial positions of the band ends on the recording surfaces. These differences increase the process time in the head switches and degrade the performance of the HDD 1.

In fabricating an HDD according to one embodiment, the number of data tracks in each band on the recording surfaces is determined by reference to the radial position of the band end. Accordingly, increase in process time for the head switches can be suppressed, even if the recording surfaces have different variation rates of the data track pitches. For a quick head switch, the radial positions of the band ends between which the head switch is performed may be as close as possible to each other, and may be substantially aligned.

Since the number of data tracks in each band is adjusted so as to align the radial positions of the band ends, the number of data tracks in each band on a recording surface may be various values. Adjusting the number of data tracks in each band within a recording surface achieves less additional moving distance of a head slider (seek distance) in a head switch at a band end, compared with a case that each recording surface has only the number of band data tracks. Besides, the variance and average of the additional moving distance become smaller than in the case that each recording surface has only the number of band data tracks.

Figure 5:
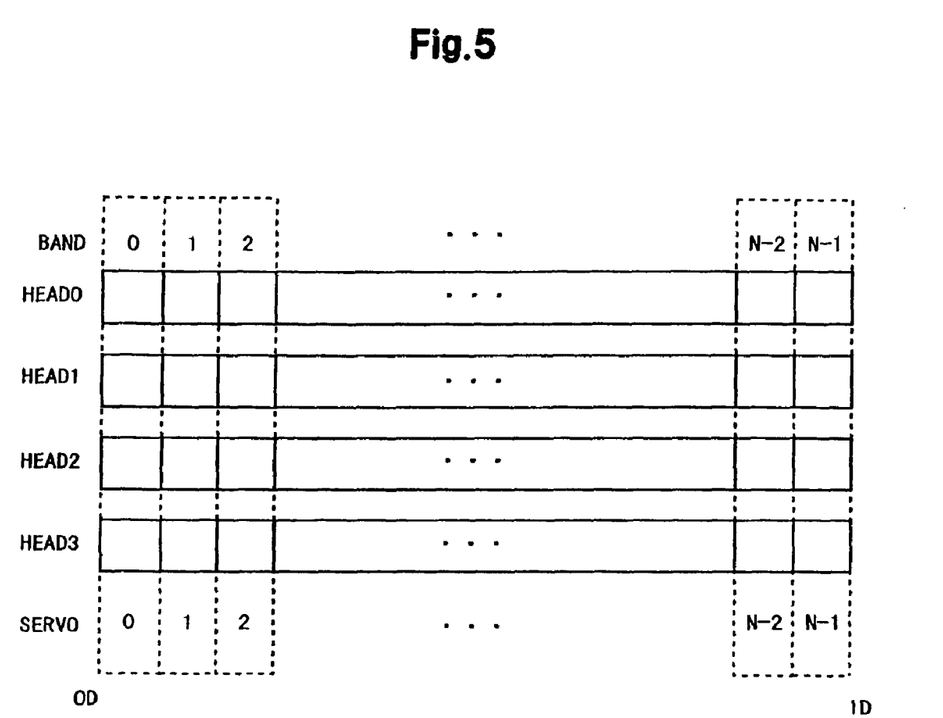
FIG. 5 is a drawing schematically illustrating recording surfaces each divided into bands by reference to servo tracks in one embodiment.

As described above, in one embodiment, the radial positions of the servo tracks on different recording surfaces are aligned with each other. Determining the number of data tracks in each band by reference to the servo tracks or the servo addresses including PES as a scale achieves alignment of the radial positions at the band ends. FIG. 5 schematically illustrates such a format in which the number of data tracks in each band is determined by reference to the servo tracks.

In fabricating an HDD 1, the total number of bands on a recording surface is determined. In the example of FIG. 5, the number of bands is N. An optimum value is selected for the number of bands from the view point of the performance of the HDD 1. Next, the width of each band (each band end) is determined by reference to the servo tracks. On this occasion, the PES may be used in addition to the servo track numbers, which is the same in the point that the servo tracks are the references. Each band end can be indicated by using a servo track. For servo control in read and write operations, each data track is made to correspond to a servo track on each recording surface. Locating the data track corresponding to the servo track indicating a band end achieves definition of the band with the data track.

Figure 6:
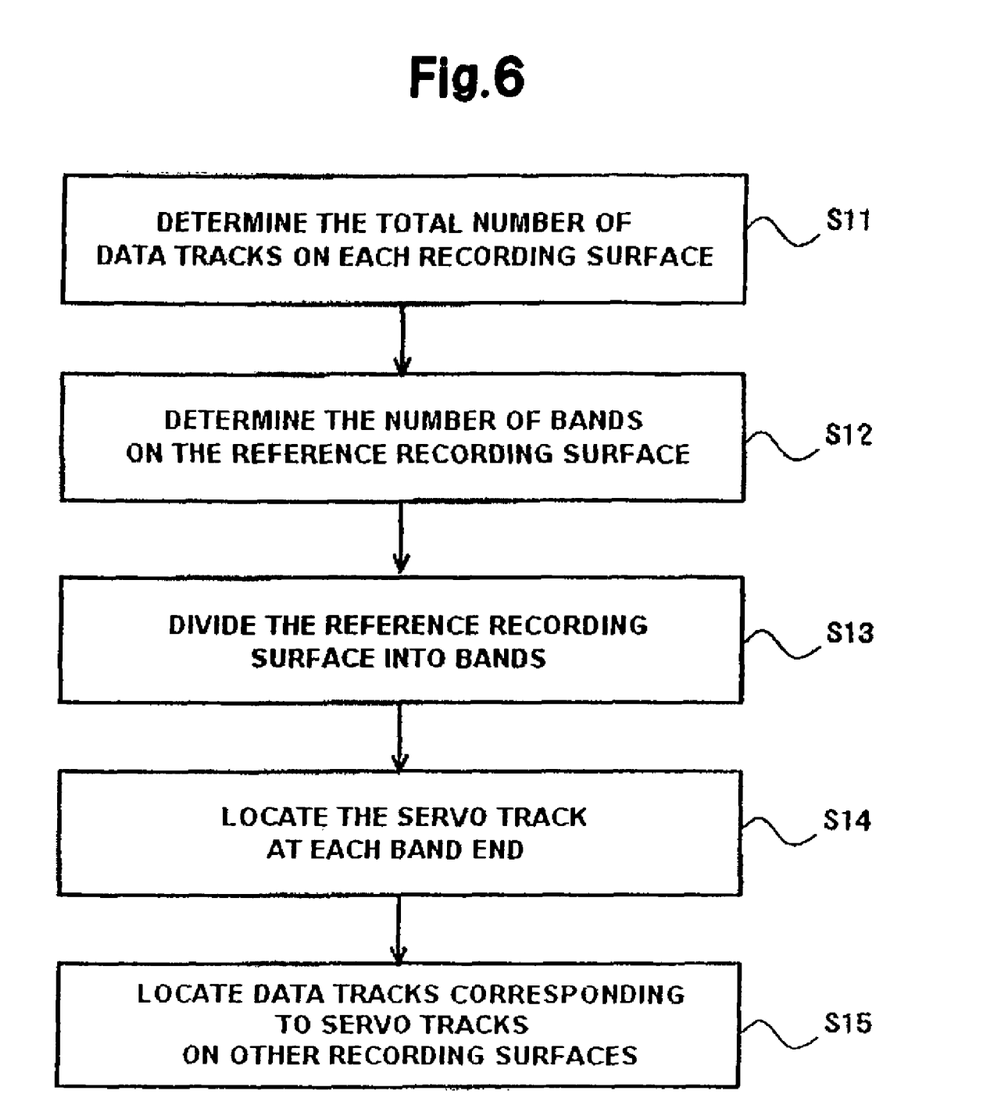
FIG. 6 is a flowchart illustrating an example of determining the number of data tracks in a band in one embodiment.

Next, a specific example of determination of the number of data tracks in each band will be described. In the present example, the HDC/MPU 23 determines the data track format, but another control circuit used in the fabricating steps may perform the same processes. As illustrated in the flowchart of FIG. 6, the HDC/MPU 23 first determines the total number of data tracks on each recording surface (S11). Variation in the radial direction in read width and write width of each head slider 12 is approximated in a polynomial in the fabricating steps. The HDC/MPU 23 refers to the polynomial approximation to determine the total number of data tracks on each recording surface.

Next, the HDC/MPU 23 selects a head slider 12 to be a reference, performs a benchmark test and a simulation test, and determines the number of bands on a recording surface from the test results (S12). Then, the HDC/MPU 23 divides the recording surface corresponding to the head slider 12 selected as the reference into bands (S13). The number of data tracks in each band may be the same. Specifically, the HDC/MPU 23 divides the total number of data tracks on the recording surface by the determined total number of bands. As to the remaining number of the data tracks, one each is assigned to one band. The remaining data tracks may be assigned sequentially from the outermost band in order to increase the storage capacity.

Figure 7:
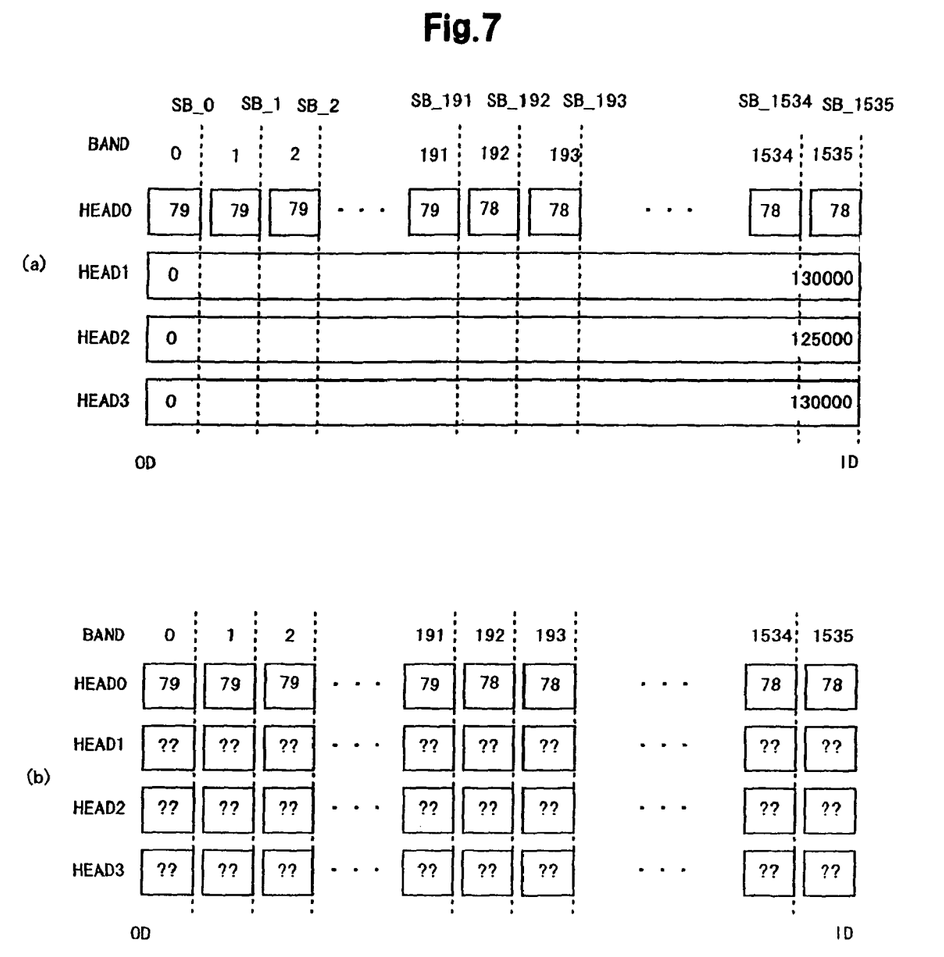
FIGS. 7(a) and 7(b) are drawings schematically illustrating an example of determining the number of data tracks in a band in one embodiment.

FIG. 7(*a*) shows an example in which the recording surface corresponding to HEAD0, which is the reference head slider, is divided into bands. In this example, the total number of data tracks on the recording surface corresponding to the HEAD0 is 120,000 and the total number of bands is 1,536. The number of data tracks in each band is 79 or 78. The bands from the outermost band 0 to the band 191 have 79 data tracks.

The HDC/MPU 23 locates the servo track corresponding to the data track at each band end on the reference recording surface (S14). In FIG. 7(*a*), each servo track STRSB_k represents the band end. The HDC/MPU 23 identifies the corresponding servo track number from a data track number at a band end. The HDC/MPU 23 calculates servo data on a target data track using a polynomial approximation in response to a command from the host 51. The HDC/MPU 23 can identify the servo track number corresponding to the data track at the band end using this function.

As shown in FIG. 7(*b*), the HDC/MPU 23 locates a data track corresponding to each located servo track on the recording surfaces other than the reference recording surface (S15). Since the recording surfaces have different servo data track pitches and their variation rates, they do not have the same number of data tracks in a band. Accordingly, the HDC/MPU 23 locates a servo track from a data track designated by the host 51 in normal operation, but does not perform its reverse process. Consequently, the HDC/MPU 23 locates a data track using a polynomial approximation.

The HDC/MPU 23 locates a data track from a servo track at a band end using the approximation. Then, it calculates the corresponding servo track number from the located data track as in normal operation. The HDC/MPU 23 determines whether or not the calculated servo track number is identical to or within the range of ±1 from the above reference servo track. If the condition has been satisfied, it determines that the data track is the band end. If the condition has not been satisfied, the HDC/MPU 23 selects an adjacent data track to the compared data track and repeats the same process.

Hereinafter, defining a band by reference to the HEAD0 in the example of FIG. 3(*b*) will be discussed. Assuming that the data track 09 for the HEAD0 is the data track at a band end, the servo track 14 is the corresponding servo track. The corresponding servo track is a servo track which includes the track center of the data track, for example. As for the HEAD1 to HEAD3, the data tracks corresponding to the servo track 14 is the data track 10, data track 08, and data track 09, respectively.

Figure 8:
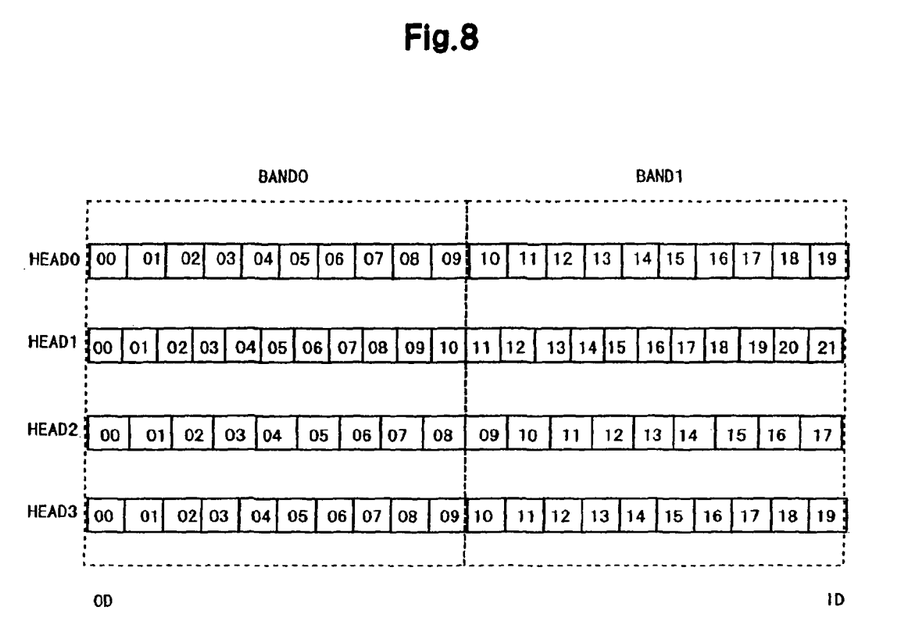
FIG. 8 is a drawing schematically illustrating a part of the recording surfaces with the bands defined by the method in FIGS. 7(a) and 7(b), according to one embodiment.

FIG. 8 shows two bands corresponding to the above example of FIG. 3(*b*). On the recording surface corresponding to the reference head slider HEAD0, data tracks 00 to 09 constitute a band and data tracks 10 to 19 constitute an inner adjacent band. The two bands on the recording surfaces corresponding to other head sliders HEAD1 to HEAD3 are shown in the same manner. The number of data tracks in a band is the same on each recording surface in the example of FIG. 8, but the number of data tracks varies with variation in the data track pitch for a whole surface of the recording surface.

As described above, in a band data track format, adjusting the number of data tracks in a band by reference to the band ends enables the radial positions of the band ends to get closer with each other to suppress increase in the process time for head switches. The band data track format and the adjustment of the number of data tracks in a band can improve the performance more even if the recording surfaces have different data track pitches.

As described referring to the flowchart of FIG. 6, defining each band on the reference recording surface and then defining each band on the other recording surfaces conforming to the band can avoid drastic variation in the number of data tracks in a band. Making the number of data tracks in each band uniform on the reference recording surface increases the effect. Although the variation rates of the data track pitches on the recording surfaces are different, the difference does not extremely increase but falls within a certain range. Therefore, defining bands on the other recording surfaces by reference to a specific reference recording surface brings the above effect.

It may also be possible to divide the servo tracks into bands by another reference instead of employing a specific reference surface and to define data track bands on each recording surface corresponding to bands of the servo tracks. For example, a servo track number corresponding to each band end may be first determined and then the number of data tracks in the band on each recording surface may be determined by means of the polynomial approximation using the determined servo track number.

Next, defect registration in the HDD 1 according to the present embodiment will be described. In fabrication, the HDD 1 performs a read-write test on each recording surface of the magnetic disks 11 to detect defects. The HDC/MPU 23 registers the detected defect data sectors in a table as error data sectors and stores the table. This defect table is stored in the magnetic disks 11 or another non-volatile memory. In processes in response to a command from the host 51, the HDC/MPU 23 skips the data sectors registered as defects. That is, data will not be recorded in the data sectors and an LBA will not be assigned to the data sectors.

In the present embodiment, the HDC/MPU 23 has the defect table for registering errors in units of data sector and another table for registering errors in units of data track. For example, if the number of error data sectors on a specific data track is more than the reference number in a read-write test, the HDC/MPU 23 registers the data track as an error data track in the table. The HDC/MPU 23 skips all of the data sectors in the error data track in normal operation. Error registration in units of data track achieves an efficient error registration and prevents an overflow of the defect table.

In the HDD 1 according to one embodiment, the number of data tracks is determined by reference to the band end and the number of data tracks in a band is variable, as described above. Therefore, even if defects are registered in units of data track, the band ends will be aligned and degradation in the performance will not arise. The number of data tracks in the definition of the band includes data tracks to be registered as defects. This is because it is necessary to consider the widths of the present data tracks regardless of presence or absence of an access in order to adjust the physically radial positions of the band ends.

As set forth above, the present invention is described by way of particular embodiments but is not limited to the above embodiments and can of course be modified in various ways within the scope of the substance of the present invention. For example, in the above embodiments, an HDD has been described by way of example but the present invention can be applied to a disk drive device using other kinds of disks, such as an optical disk and a magneto-optical disk. In a common HDD, all data areas on all recording surfaces are divided into bands but the present invention can be applied to an HDD in which a part of the recording surfaces or a part of the areas on the recording surfaces are divided into bands. Embodiments of the present invention are also applicable to an HDD whose recording surfaces have a common servo track pitch or have different servo track pitches and their variation rates.

What is claimed is:

1. A method for determining data track formats on multiple recording surfaces for addresses designated by a host in a disk drive device comprising:
   determining a data track pitch for each data track on each of the multiple recording surfaces;
   generating a plurality of bands on each of the multiple recording surfaces, each band of said plurality of bands consisting of a number of data tracks wherein a band end for each of said plurality of bands is determined by reference to a servo track and not determined by the number of data tracks included in each said band;
   adjusting the number of data tracks in each of said plurality of bands by reference to the band end for each of said plurality of bands;
   registering a data track including a greater number of errors than a reference number as a non-use data track to be skipped in data accesses; and
   determining data track formats so that addresses designated by a host continues from each band end to a corresponding band end on another recording surface, while addresses designated by the host are continuous in each band, wherein a number of servo tracks of movement in a head switch at each band end among the multiple recording surfaces is no more than one.

2. The method according to claim 1, wherein the determining the number of data tracks included in each band comprises:
   determining the number of data tracks in each band on one of the multiple recording surfaces, and
   determining the number of data tracks in each band on another recording surface by reference to the band ends on the one of the multiple recording surfaces.

3. The method according to claim 2, wherein the determining the number of data tracks included in each band comprises:
   determining the number of data tracks in each band on the one of the multiple recording surfaces;
   locating servo tracks each corresponding to each band end on the one of the multiple recording surfaces; and
   determining the number of data tracks in each band on another recording surface using the located servo tracks.

4. The method according to claim 3, wherein radial positions of the servo tracks corresponding to each other on the multiple recording surfaces are substantially aligned with each other.

5. The method according to claim 1, wherein, among the multiple recording surfaces, the number of data tracks included in each band are determined so that the difference in servo track number corresponding to a band end between bands having the same band number counted from the innermost or the outermost band falls within a range.

6. The method according to claim 1, wherein the number of data tracks in each band on one of the multiple recording surfaces is determined so that the difference in the number of data tracks between the bands is no more than one; and the number of data tracks of each band on another recording surface are determined by reference to the band ends on the one of the multiple recording surfaces.

7. The method according to claim 1, wherein the determining the number of data tracks in each band comprises:
   determining servo track numbers each corresponding to each band end; and
   determining the number of data tracks in each band on each recording surface using the servo track numbers.

8. A disk drive device comprising:
   multiple recording surfaces whose variation rates of data track pitches in the radial direction are different from each other;
   multiple heads corresponding to the multiple recording surfaces;
   a moving mechanism for supporting and concurrently moving the multiple heads; and
   a controller for controlling the moving mechanism and the multiple heads; wherein each of the multiple recording surfaces has multiple bands each constituted by multiple tracks, and the number of tracks included in each band on all or a part of the recording surfaces is not fixed, but determined by reference to a band end for each of said multiple bands, said band end defined by a servo track, wherein a number of servo tracks of movement in a head switch at each band end among the multiple recording surfaces is no more than one; and if the controller receives a command designating continuous addresses from a host, the controller performs continuous accesses in each band and further controls to perform a head switch at each band end, wherein the controller refers to a table in which non-use data tracks are registered and skips the registered data tracks in data accesses.

9. The disk drive device according to claim 8, wherein radial positions of servo tracks corresponding to each other on the multiple recording surfaces are substantially aligned with each other.

10. The disk drive device according to claim 9, wherein the number of servo tracks of movement in a head switch at each band end among the multiple recording surfaces is no more than one.

11. The disk drive device according to claim 8, wherein the difference in the number of data tracks between the bands on one of the multiple recording surfaces is no more than one.

* * * * *